(12) United States Patent
Yuhan (10) Patent No.: US 9,641,598 B1
(45) Date of Patent: May 2, 2017

(54) CONTEXTUALLY UNIQUE IDENTIFIER GENERATION SERVICE

(71) Applicant: Amazon Technologies, Inc., Reno, NV (US)

(72) Inventor: John Sandeep Yuhan, Lynnwood, WA (US)

(73) Assignee: Amazon Technologies, Inc., Reno, NV (US)

( * ) Notice: Subject to any disclaimer, the term of this patent is extended or adjusted under 35 U.S.C. 154(b) by 246 days.

(21) Appl. No.: 14/230,480

(22) Filed: Mar. 31, 2014

(51) Int. Cl.
 *G06F 15/16* (2006.01)
 *H04L 29/08* (2006.01)

(52) U.S. Cl.
 CPC .............. *H04L 67/10* (2013.01); *H04L 67/00* (2013.01)

(58) Field of Classification Search
 CPC ....................................................... H04L 67/00

USPC ................................................. 709/201, 202
 See application file for complete search history.

(56) References Cited

U.S. PATENT DOCUMENTS

| 6,023,721 A * | 2/2000 | Cummings ........... G06F 9/4843 707/999.008 |
| 2015/0215315 A1 * | 7/2015 | Gordon ................... G06F 21/31 726/5 |

\* cited by examiner

*Primary Examiner* — Adnan Mirza
(74) *Attorney, Agent, or Firm* — Baker & Hostetler LLP

(57) ABSTRACT

Random numbers or unique identifiers may be generated up receiving an API call from a remote system requesting such numbers or identifiers. The API call may specify characteristics desired in the provided number or identifier, such as numeral system, length, character types, lifespan, etc. The number or identifier generation system may track the numbers to ensure that each requesting system receives numbers or identifiers unique to that system.

16 Claims, 6 Drawing Sheets

CONTEXTUALLY UNIQUE IDENTIFIER GENERATION SERVICE

BACKGROUND

Random numbers and unique identifiers are commonly used in computing systems for various tasks. One of the most common is identification of information and objects. For example, unique identifiers or random numbers may be used to identify interfaces, controls, files, objects, database keys or any other generated item or construct that a computing system may need to track. A unique identifier or random number may be combined with other data to form an identifier for an identified item. Such other data may provide additional information such as a date, item ownership, context, etc. Random numbers and unique identifiers are not typically truly unique and/or random as there are only finite computing resources available at any system, but most implementations of random number and unique identifier generators can produce numbers and identifiers that are virtually unique and very unlikely to be the same as other numbers and identifiers generated. Random numbers and unique identifiers are currently generated locally by the device or system that desires a random number or unique identifier, thereby using local resources and requiring that the device maintain records where identifier and/or number tracking is needed. This results in the diversion of resources that may be better directed to the main functions of such a device or system.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Computing systems often have a need for random numbers or identifiers that are unique or relatively unique. Unique or relatively unique identifiers are commonly based on random numbers or random strings of characters. Generating unique identifiers or random numbers (used interchangeably herein) locally may overburden a computing system or divert resources away from more essential tasks. In an embodiment, such a computing system may request one or more random numbers or unique identifiers from a remote system, such as a cloud-based service, by sending a request to an application programming interface (API). This request may be referred to as an "API call". The API may allow the requesting system to specify a type and/or quantity of random numbers or unique identifiers requested using parameters provided with the API call. The random number or unique identifier generation system may track the numbers or identifiers provided to particular systems or applications to ensure that the numbers or identifiers provided to that system or application are unique to that system or application.

Figure 1:
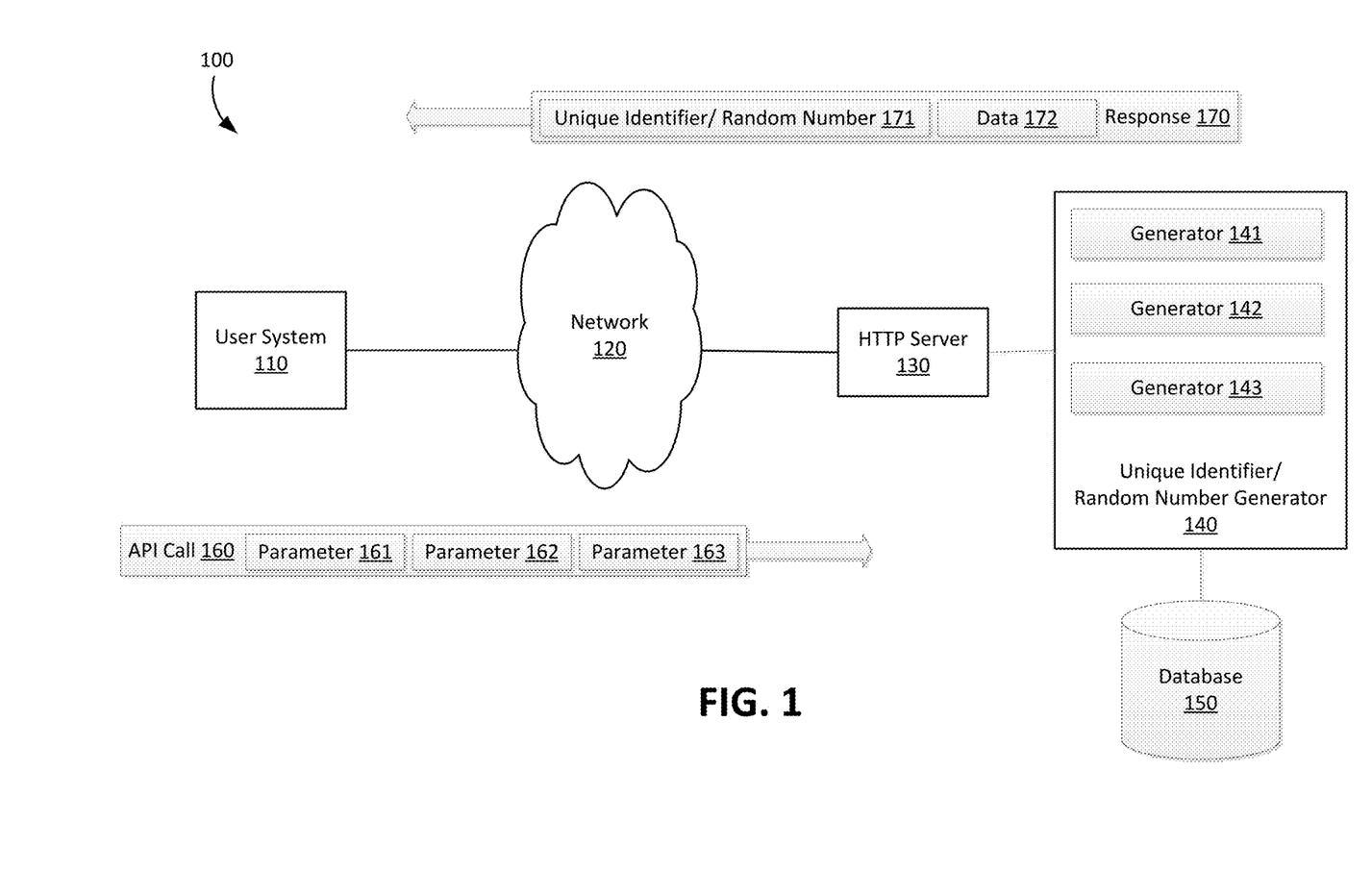
FIG. 1 illustrates an example environment in which embodiments of the invention may be implemented.

FIG. 1 illustrates non-limiting exemplary system 100 in which embodiments of the instant disclosure may be implemented. System 100 is a simplified diagram of a system that may be used to implement the disclosed embodiments, but those skilled in the art will recognize that such a system may include other elements, including those as described herein in regard to FIGS. 6, 7 and 8. User system 110 may be any type of computer, computing device, server, cluster of servers, distributed computing system or any other device or combination of devices of any type capable of communicating with one or more other devices. User system 110 may be executing software that is capable of performing a call to an application programming interface (API). An API is a specification that sets forth one or more routines that may be called (i.e., invoked) and the manner in which such routines may be called. For example, an API may specify a name of a routine and one or more parameters that each represent or contain data or information to be provided to the routine. Calls to a particular API may be used to effectuate the performance of certain tasks. For instance, user system 110 may be in need of a random number or a unique identifier and may perform an API call that sends a request to another system or device for a random number or a unique identifier.

User system 110 may be communicatively connected to network 120. Network 120 represents any type and number of networks, including the Internet, and any combination thereof, that facilitate communication between devices. The communication links between user system 110 and network 120, and any communication link and any means that may be used to facilitate communication between two or more devices described herein, may be any type and number of communications links capable of facilitating communication between two or more devices, including a wired communications link, a wireless communications link and a combination thereof, using any protocol or other means of enabling communication between devices. All such embodiments are contemplated as within the scope of the present disclosure.

HTTP server 130 may also be communicatively connected to network 120 by any type and number of communications links. HTTP server 130 may be any type and number of servers or devices that perform the functions of a hypertext transfer protocol (HTTP) server. HTTP server 130 may be communicatively connected to unique identifier/random number generator 140 (also referred to herein as "identifier generation system 140" or simply "generator 140") that may be any type and number of devices that are capable of generating unique identifiers and/or random numbers as set forth herein. Note that generator 140 represents any one or more servers, co-located or remote from one another, that may execute services and applications that may be referred to herein as "generators". Any number and type of generator servers are contemplated as within the scope of the present disclosure. Generator 140 may be communicatively connected to database 150 that represents any type and number of devices that may implement, host, or otherwise provide database services for one or more generator applications or services.

HTTP server 130 may exchange data with user system 110. For example, user system 110 may perform an API call that generates API call 160 that is transmitted to HTTP server 130. API call 160 represents one or more messages, frames, packets, etc., that are generated as a result of user system 110 performing an API call. API call 160 may be a request for generation of one or more random numbers and/or unique identifiers, allowing user system to request that generator 140 generate such numbers and/or identifiers rather than generating them locally at user system 110. API call 160 may include zero or more parameters that may specify required or optional data that may be provided in API call 160 to the called API as set forth below in more detail. API call 160 may also include any other data necessary for relaying API call 160 to a device and data for providing a response, such as source and destination addresses, port number(s), etc. Alternatively, such data may be included in a frame, packet, and/or any other structure in which API call 160 may be encapsulated or otherwise transported. All such embodiments are contemplated as within the scope of the present disclosure.

Upon receiving API call 160, in some embodiments via network 120, HTTP server 130 may determine that API call 160 is intended for generator 140 and in response may relay or otherwise convey API call 160 and/or the data therein to generator 140. HTTP server 130 may determine that generator 140 is the appropriate destination for API call 160 using any means or methods known to those skilled in the art. Upon receipt of API call 160, generator 140 may process API call 160 and generate response 170 that may be transmitted to user system 110 via HTTP server 130 and, in some embodiments, network 120. Response 170 may include one or more requested unique identifiers/random numbers 171 and other data 172 as described in more detail herein. Response 170 represents one or more messages, frames, packets, etc., that are generated as a result of generator 140 processing API call 160. Response 170 may also include any other data necessary for relaying response 170 to user system 110, such as source and destination addresses, port number(s), etc. Alternatively, such data may be included in a frame, packet and/or any other structure in which response 170 may be encapsulated or otherwise transported. All such embodiments are contemplated as within the scope of the present disclosure.

In some embodiments, generator 140 may track unique identifiers and/or random numbers provided to requesting systems using database 150. For example, to ensure that no duplicate unique identifiers or random numbers are provided to the one system or device, generator 140 may store unique identifiers or random numbers sent to a particular system or device in database 150 with an identifier of the particular system associated with each of the unique identifiers or random numbers.

In some embodiments, generator 140 may be a distributed system with several generators that may be used to generate random numbers and/or unique identifiers. For example, generator 140 may distribute generation load across generators 141, 142, and 143. In such an embodiment, generator 140 may serve as a management layer to a random number/unique identifier system and handle the management of generators and communications with other devices.

According to the disclosed embodiments, a random number or unique identifier API may specify parameters that may be provided by the requesting entity that indicate the type of response requested or other preferences of the requesting entity. The API may be defined using any means or methods in any programming language or abstraction. Shown below is an example definition of an API call for in pseudocode. Any means or methods of defining an API are contemplated as within the scope of the present disclosure:

getUniqueID {parameter 1, parameter 2, . . . parameter N}

Shown below is an example API call using HTTP format. Any means or methods of constructing and transmitting an API call are contemplated as within the scope of the present disclosure:

https://[examplewebsite].com/?Action=getUniqueID&Parameter.1=X &Parameter.2=Y& Parameter.3=Z Table 1 below lists parameters that may be defined by an API and included in an API call according to the embodiments set forth herein. Any zero or more of these parameters may be required or optional as defined by the API. In some embodiments, no parameters are used and an API call simply returns a random number or an identifier (unique or otherwise) in a default form and format as defined by the API. In some embodiments, a context is determined by a generator implicitly. For example, a generator may use an IP address, in some embodiments in combination with a port number, to determine a system that is requesting a random number or unique identifier. The generator may then track the identifiers or random numbers provided to that system using an identifier of that system based on the IP address and/or other contextual information. In other embodiments, a context may simply refer to a user-defined parameter that a requesting system provides. For example, a requesting system may be executing several applications and may assign some type of label to each application. This label may then be provided by the requesting system as a context parameter in a request for a random number or unique identifier. Any type of label, name, identifier, string, data, or any other information may be used as a context parameter, defined by a requesting system, and/or used by a generator to track the issuance of a random number or unique identifier. Default values may also be used for any or all of the parameters below or any other possible parameters, such as expiration times, whether to track issued numbers or identifiers, numbers of bits of returned numbers or identifiers, format of returned numbers or identifiers, alphanumeric property of returned numbers or identifiers, etc.

In some embodiments, some or all parameters may be determined indirectly for an API call based on data associated with the requesting system, a context, a default configuration, or any other criteria. For example, the requesting system may be associated with a policy established or requested by a customer operating the requesting system. The policy may specify any zero or more of the parameters disclosed herein. Upon receipt of a request, a generator may determine the related policy, or the parameters associated therewith, and use that data, in some embodiments in combination with one or more other parameters received with the request, to generate the requested numbers or identifiers. The determination of the related policy, or the parameters associated therewith, may be based on an identifier of the customer, customer account, requesting system, a parameter included in the request (e.g., one parameters identifies a policy), or any other means. All such embodiments are contemplated as within the scope of the present disclosure.

Examples of parameters, associated data, and returned identifiers are set forth below for illustrative purposes only.

Any form, order, notation and other types of data used for returned numbers or identifiers are contemplated as within the scope of the present disclosure.

TABLE 1

Parameters that may be defined by disclosed API and included in API calls

| Parameter | Definition |
|---|---|
| Context | System identifier for requesting system, such as, but not limited to, system IP address, system identifier, customer identifier, virtual network identifier, application identifier, etc. A context parameter may also be a user defined and may take any form, format, or content that may be provided by a requesting system. This may allow the generator to track the returned identifiers by context, ensuring that the identifiers provided are contextually unique. |
| Track | This may specify whether the generator is to track the returned identifiers or numbers. A requesting system may simply want a number or identifier, while another system may want a contextually unique number or identifier that has not and will not be used within that system while the returned number or identifier is active (i.e., not expired). |
| Include-Context | Whether to include context information in the returned unique identifier. For example, a random number or unique identifier may be concatenated with a context identifier or indicator of the context. Some requesting systems may not want the generated unique identifier to include identification information for the requesting system for security reasons. Example returned identifier, random number in decimal concatenated with system identifier: 4591621574805524satisfiedcustomer |
| Bits | Specifies the number of bits of a requested random number or unique identifier. For example, a 128-bit random number may be requested. Note that this may be independent of the alphanumerical format and length in any base other than binary. Any number of bits is contemplated as within the scope of the present disclosure. |
| Number-Of-Digits | Specifies length of requested random number or unique identifier in any form, and may also specify the numeral system (i.e., base) of the number returned (e.g., number of binary digits, number of hexadecimal digits, number of decimal digits, etc.) or character format (alphabetic, numeric, alphanumeric). Any number of digits is contemplated as within the scope of the present disclosure. Example returned identifier, random number in 16 decimal digits: 4591621574805524 |
| Alpha | Specifies that generated random number or unique identifier is to be provided as a string of alphabetic characters. May include specifying upper case characters only, lower case characters only, combination of upper and lower case characters, whether to include special characters, etc. Example returned identifier, random number in 16 alphabetic characters: AHZDIHFEUINSYHGS |
| Numeric | Specifies that generated random number or unique identifier is to be provided as a string of numerals. Example returned identifier, random number in 16 numeric digits: 4591621574805524 |
| Alpha-Numeric | Specifies that generated random number or unique identifier is to be provided as a string of both numerals and alphabetic characters. May include specifying upper case alphabetic characters only, lower case alphabetic characters only, combination of upper and lower case alphabetic characters, whether to include special characters, etc. Example returned identifier, random number in 16 alphanumeric digits: 45A16FW574Z05KJ4 |
| RegEx | Provides regular expression that defines format of random number or unique identifier to be provided. Example returned identifier where regular expression indicated that first eight digits are alphabetic and last eight digits are numeric of 16 digit identifier: FHWEIRHD48567862 |
| Range | Specifies range of values within which generated random number or unique identifier is to be drawn from. For example, a requesting system may request a random number between 0 and 1,000,000. The base of the range (binary, decimal hex) may also be provided or set by default. Any range of values is contemplated as within the scope of the present disclosure. Example returned identifier in decimal, where a random decimal number between 0 and 1,000,000 was requested: 0000000008439758 |
| Include-Date Include-Time | Specifies that the current date or time, in any granularity, is to be included in the returned unique identifier. For example, a date and time of generation of the random number or unique identifier may be concatenated with the random number or unique identifier. A format of the date may also be specified, with this parameter or as a separate parameter. Any format of a date or time is contemplated as within the scope of the present disclosure. Example returned identifier, random number in 16 decimal digits concatenated with date and time down to seconds (date and time underlined for ease of illustration, format is YYYYMMDDHHMMSS): 459162157480552420140307053541 |
| Expiration Expiration Time | Specifies whether the random number or unique identifier should expire, and in some embodiments when it should expire or a lifespan of the random number or unique identifier. At expiration, the random number or unique identifier may be deleted along with associated data, or the random number or unique identifier and its associated data may be marked for deletion at a later time. This may indicate to the generator of the random number or unique identifier when the generator should stop tracking the generated random number or unique identifier and delete it (or mark it for deletion) from its tracking database or otherwise indicate that the random number or unique identifier is available for future random number or unique identifier generation, allowing that number or identifier to be returned to the pool of available random number or unique identifiers. Alternatively, this parameter may simply indicate that the returned identifier should expire, and the generator may use a default value for the identifier's lifespan. The expiration time may also be included in the returned identifier so that it may also be used by the requesting system. In such embodiments, this parameter may specify the format of the expiration date to be provided. Any date or time format is contemplated as within the scope of the present disclosure. Example returned identifier, random number in 16 decimal digits concatenated with expiration date and time down to seconds (date and time underlined for ease of illustration, format is YYYYMMDDHHMMSS): 459162157480552420140407053541 |
| RNG | Specifies a particular random number generator, generation method, or generation algorithm to be used by the generator. In some embodiments, a generator may offer more than one random number generation method and may allow a requesting system to specify the method. |
| Seed | Specifies a seed to be used by the random number generator or generation method to generate a random number to be returned or to generate a random number to serve as a basis for an identifier to be returned. Alternatively, this parameter may specify that a current time or a time of generation is to be used as the seed or the basis of the seed used. |
| Quantity | Specifies a number of random numbers or unique identifiers to be returned. In some embodiments, a system may request a batch of numbers for use with a task that requires more than one random number or unique identifier. This may prevent the need for such a system to send multiple API calls to obtain the batch of numbers. |

Note that rather than a more generic API call with a variety of possible parameters (e.g., getUniqueID {parameter1, parameter2, . . . parameter N}), multiple API calls providing various results associated with the particular API call are contemplated for other embodiments. For example, one API call may request a ten-digit decimal numeric unique identifier or random number (e.g., getTenDigDec { }), while another may request a set of five 128-bit unique identifiers or random numbers in hexadecimal (e.g., get128Hex5Set { }). Alternatively, or in addition, some embodiments may support a combination of more specific calls and parameters. For example, an API call may request a ten-digit decimal numeric unique identifier or random number and permit parameters indicating context and expiration date or time (e.g., getTenDigDec {context_parameter, expiration_parameter}). All such embodiments are contemplated as within the scope of the present disclosure.

Figure 2:
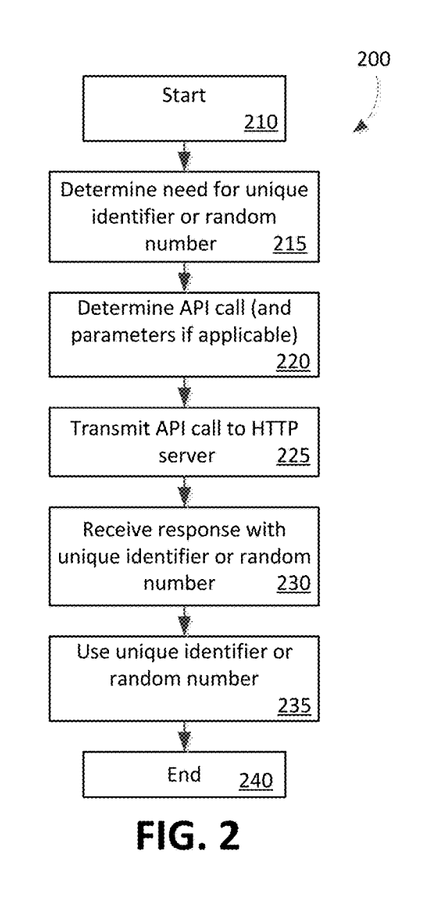
FIG. 2 depicts example operating procedures for a user system according to embodiments.

FIG. 2 depicts example operating procedures 200 for a device, system, group of devices or systems, software module executing on hardware or any other entity that may request one or more unique identifiers or random numbers (referred to herein for ease of description as "user system") according to embodiments. Operating procedures 200 begin with operation 210 and move to operation 215 where a user system may determine that it has a need for one or more unique identifiers or random numbers. As one skilled in the art will appreciate, there are many situations where a computing system may have a need for such a number or identifier. At operation 215, an API call (in HTTP format or otherwise) requesting one or more unique identifiers or random numbers may be determined and generated at the user system. The API call may include a customer account identifier that may be used by a generator to determine parameters based on an associated policy and/or for charging and billing purposes. The customer account identifier may be a parameter. Any parameters that are needed or desired may also be determined at this operation. The API call may take any form as disclosed herein, and may be transmitted at operation 225 directly from the user system to a generator or transmitted via other systems, such as an HTTP server.

At operation 230, a response that includes one or more unique identifiers or random numbers may be received, as well as any additional data that may be provided beyond the requested unique identifiers or random numbers. For example, an expiration time and/or date may be included in the response, and/or tracking information for the generated unique identifiers or random numbers, context information (allowing the user system to confirm that the appropriate context was initially provided), etc. At operation 235, the user system may make use of the received unique identifiers or random numbers and any associated data. After operation 235, operating procedures 200 move to operation 240 where they end.

Figure 3:
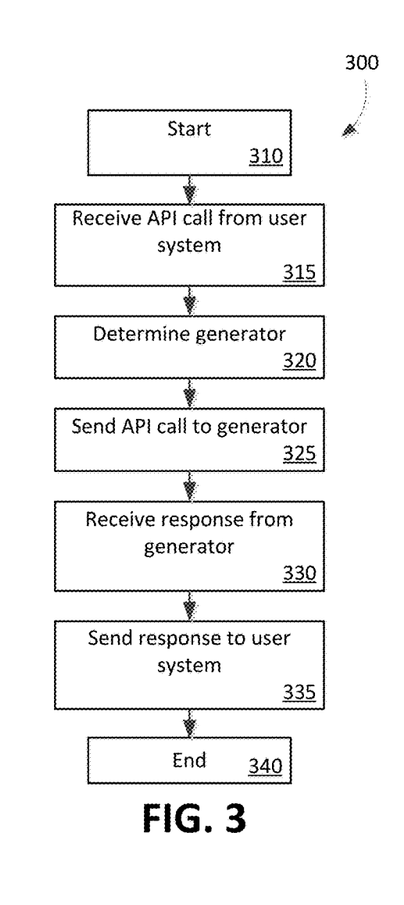
FIG. 3 depicts example operating procedures for an HTTP server according to embodiments.

FIG. 3 depicts example operating procedures 300 for an HTTP server according to embodiments. Alternatively, operating procedures 300 may be performed by a device, system, group of devices or systems, software module executing on hardware or any other entity that may serve to relay or otherwise communicate an API call requesting one or more random numbers or unique identifiers and a response to such a call between a user system and a generator. Operating procedures 300 begin with operation 310 and move to operation 315 where an HTTP server may receive an API call in HTTP format requesting a unique identifier or random number from a user system. At operation 320, the HTTP server may determine an appropriate generator to which to forward or relay the API call. This may be accomplished using any available means or methods. In one example, where the HTTP server distributes the load of requests for unique identifiers or random numbers to perform load balancing of such requests or to ensure that no single generator becomes overloaded, the HTTP server may determine the best available generator and transmit the API call or its equivalent to the chosen generator. At operation 325, the HTTP server may send the API call or its equivalent to the chosen generator. Alternatively, as operation 325 the HTTP server may write or otherwise store data or an indicator to a database that may then be detected by another system or service that will, in response, initiate the generation of the unique identifiers or random numbers. For example, a generator may be associated with a service that detects the storage of an indicator and/or other data indicating that a request has been received for one or more unique identifiers or random numbers, and in response instruct the generator to generate the requested unique identifiers or random numbers.

At operation 330, a response may be received at the HTTP server from the generator. Alternatively, the HTTP server may be associated with a service that detects the storage of data indicating that the requested unique identifiers or random numbers have been generated, and in response may retrieve such unique identifiers or random numbers and generate a response for the requesting system. The response may contain any requested one or more unique identifiers or random numbers, as well as any associated data that may be provided with such unique identifiers or random numbers. At operation 335, this response, or the data contained therein, including the requested unique identifier(s) or random number(s), may be transmitted to the user system that requested it. After operation 335, operating procedures 300 move to operation 340 where they end.

Figure 4:
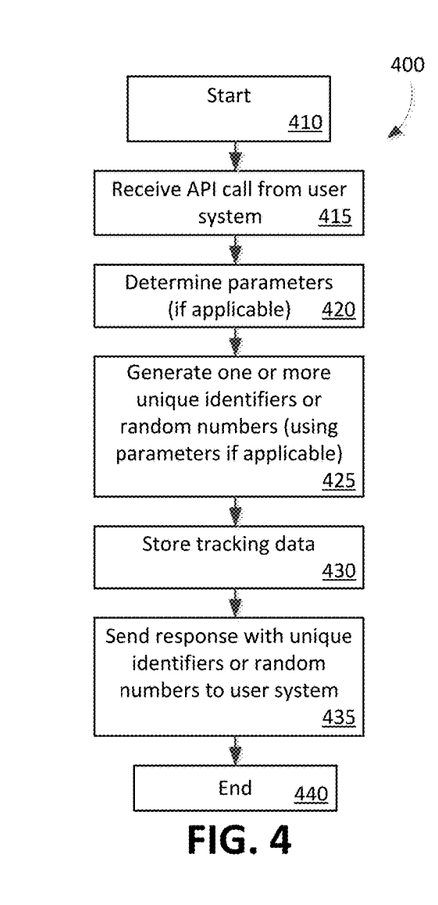
FIG. 4 depicts example operating procedures for a random number or unique identifier generator according to embodiments

FIG. 4 depicts example operating procedures 400 for a device, system, group of devices or systems, software module executing on hardware or any other entity that may generate one or more unique identifiers or random numbers (referred to herein for ease of description as simply a "generator") according to embodiments. Operating procedures 400 begin with operation 410 and move to operation 415 where a generator may receive an API call (in HTTP format or otherwise) requesting one or more unique identifiers or random numbers that originated at any user system. The API call may take any form as disclosed herein, and may be received directly from a user system or via other systems, such as an HTTP server. Alternatively, the generator may be associated with a service that detects the storage of an indicator and/or other data indicating that a request has been received for one or more unique identifiers or random numbers, and may receive an instruction or otherwise begin generation of a random number or unique identifier in response. At operation 420, the generator may determine parameters included with the API call if any were provided. Included in operation 420 may be the determination of a customer account identifier. This may be determined based on the API call, or a customer account identifier may be included as a parameter. Alternatively, or in addition, the generator may determine one or more parameters based on data associated with the requesting system or context (e.g., based on a policy associated with the requesting system or context). In some embodiments, no parameters may be required or permitted by the API, while in other embodiments parameters may be optional or may be required.

At operation 425, the generator may generate the one or more requested unique identifiers or random numbers, using the provided or acquired parameters if applicable. If applicable, the generator may also ensure that the generated number or identifier is not one that has already been provided to the requesting user system. This may be accomplished by, for example, querying a database with tracking information for such numbers and identifiers that are not expired. Alternatively, the generator may determine a pool of available numbers or identifiers by excluding those not listed in a database containing the unexpired numbers or identifiers provided to the requesting user system. Any other actions may be taken at operation 425 to generate a unique identifier or random number that complies with the parameters and any requirements on the generator for generating unique identifiers or random numbers for the requesting user system. A complete response may also be generated at this operation, if such a response includes data beyond the requested unique identifiers or random numbers. For example, an expiration time and/or date may be provided, tracking information for the generated unique identifiers or random numbers, context information (allowing the requesting user system to confirm that the appropriate context was initially provided), etc.

At operation 430, the generator may store, in some embodiments in a database, any tracking information that may be associated with the request in the API call and/or the context of the request (e.g., requesting user system, etc.). For example, in order to ensure that the requesting user system receives numbers or identifiers that are unique to the requesting user system, the generator may track such numbers or identifiers, for example by storing them in a database with associated identifying information. When a number or identifier is requested by a user system, the generator may query this database in the generation process to determine a pool of numbers or identifiers from which to select a requested number or identifier. Alternatively, the generator may generate a number or identifier and then compare it to those associated with the context (e.g., user system, etc.) to ensure that it is not a same unexpired number or identifier as provided previously. Other means and methods of tracking and determining relatively unique numbers or identifiers are contemplated as within the scope of the present disclosure. Other data associated with the user system or requested number or identifier may also be stored, such as an expiration time or date or a lifespan of a requested number or identifier. In some embodiments, the generator may track a number of requested numbers or identifiers, in an example within a period of time, in order to ensure proper billing for the operator of the user system (e.g., where the operator pays for a certain number of numbers or identifiers per time period). Any other means or methods of determining and storing data associated with a generated unique identifier or random number are contemplated as within the scope of the present disclosure.

At operation 435, a response with the one or more unique identifiers or random numbers, as well as any associated data that may be provided with such unique identifiers or random numbers, may be transmitted to the requesting user system. Also at 435, in some embodiments charging and/or billing information associated with a customer account identifier may be stored or transmitted to a billing system. After operation 435, operating procedures 400 move to operation 440 where they end.

Figure 5:
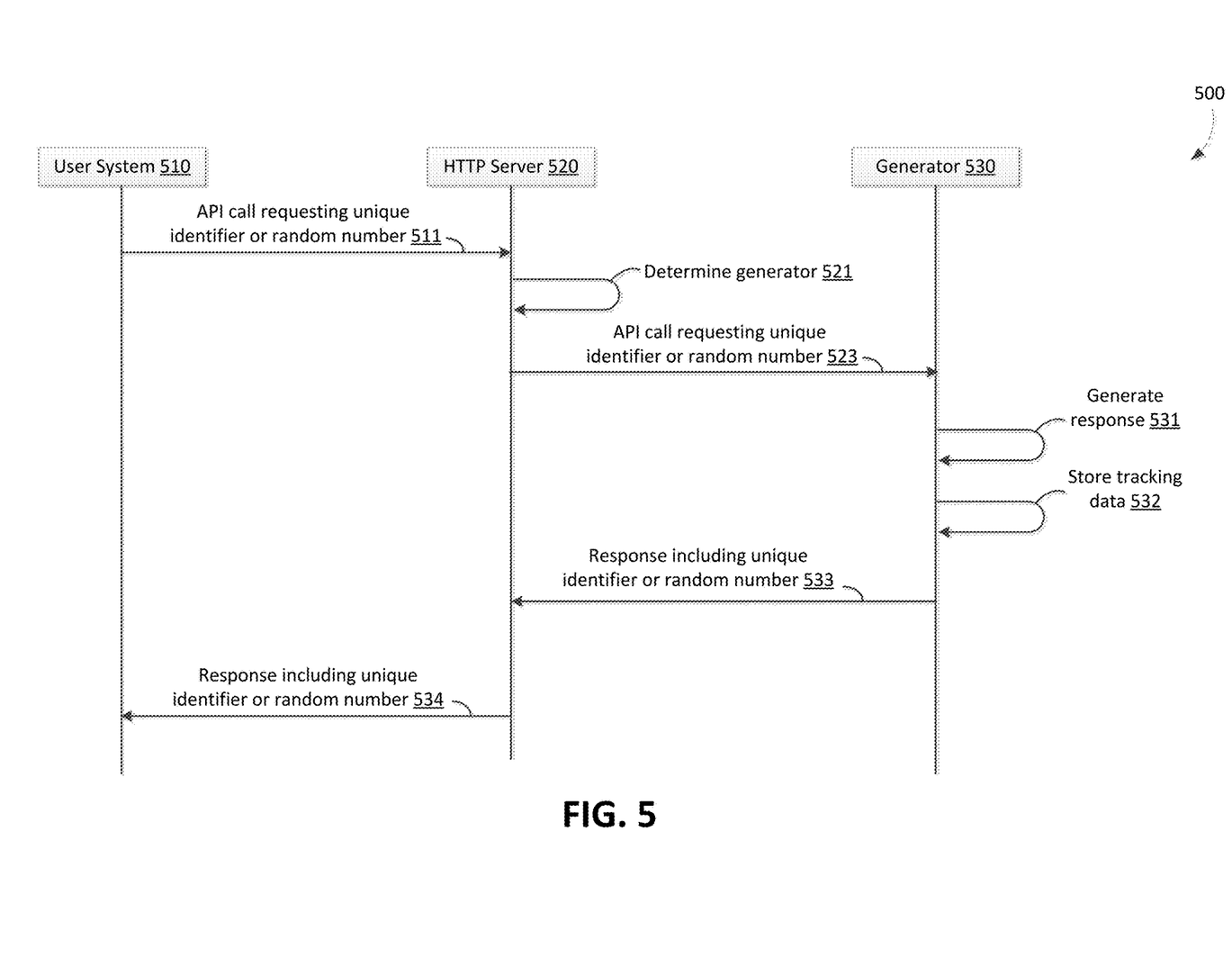
FIG. 5 depicts an example signal flow according to embodiments.

FIG. 5 illustrates exemplary non-limiting signal flow 500 showing example communications that may occur between a user system, an HTTP server and a generator according to some embodiments of the present disclosure. Note that the user system, HTTP server, and generator used in FIG. 5 may be any of such devices as described herein. User system 510 may request one or more unique identifiers or random numbers with an API call (in some embodiments including one or more parameters) transmitted to HTTP server 520 at communication 511. In response, HTTP server 520 may determine 521 an appropriate recipient generator for the API call. Having determined generator 530 is the most appropriate generator, or the default or only generator, HTTP server 520 may transmit the API call at communication 523 to generator 530.

At operation 531, generator 530 may generate a response, including one or more unique identifiers or random numbers and any data that may be provided with such unique identifiers or random numbers. At operation 532, generator 530 may also store any tracking data, update a database, or otherwise store data related to the request and response. The response may be sent to HTTP server 520 in communication 533. HTTP server 520 may forward the response or otherwise convey the content of the response to user system 510 in communication 534.

Note that the instant embodiments may be used with any systems that may request one or more unique identifiers or random numbers, generate responses including one or more unique identifiers or random numbers and/or relay such requests and responses. Such systems may be operated by, but are not limited to, service providers and cloud-based servers and systems. One skilled in the art will appreciate that the disclosed embodiments can be readily applied to a variety of systems, and all such applications are contemplated as embodiments that are within the scope of the present disclosure.

Figure 6:
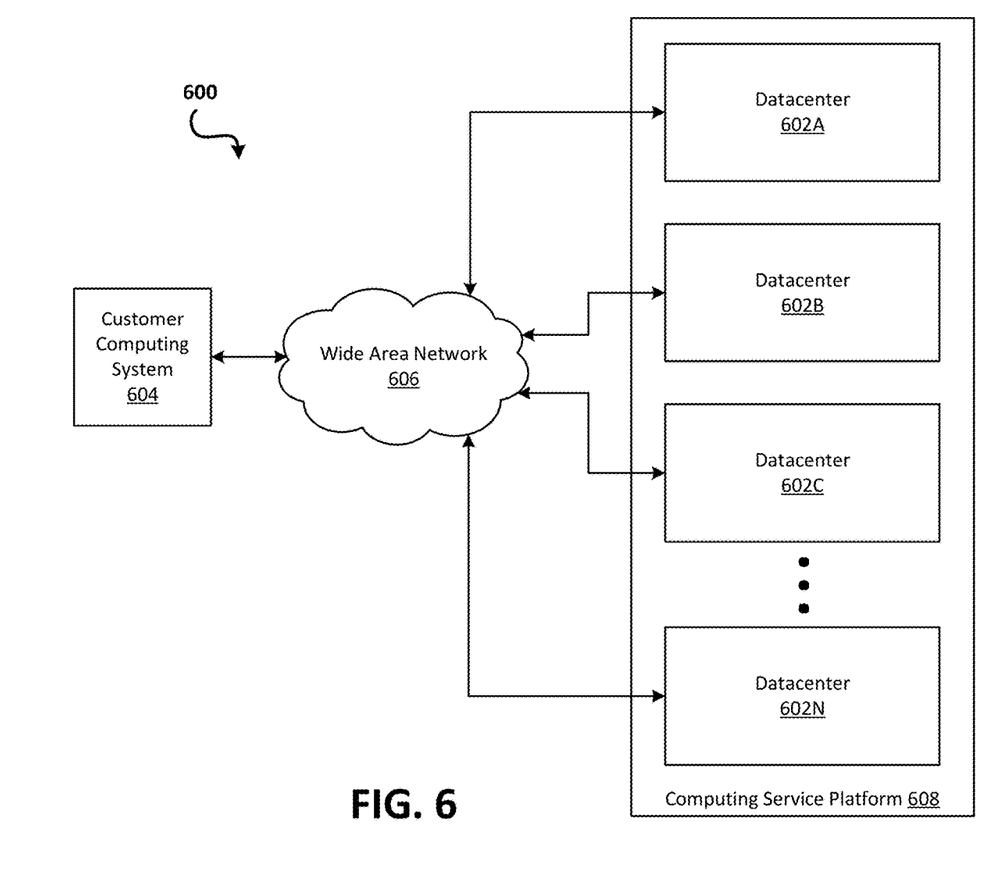
FIG. 6 depicts an example of a suitable computing environment in which embodiments described herein may be implemented.
Figure 7:
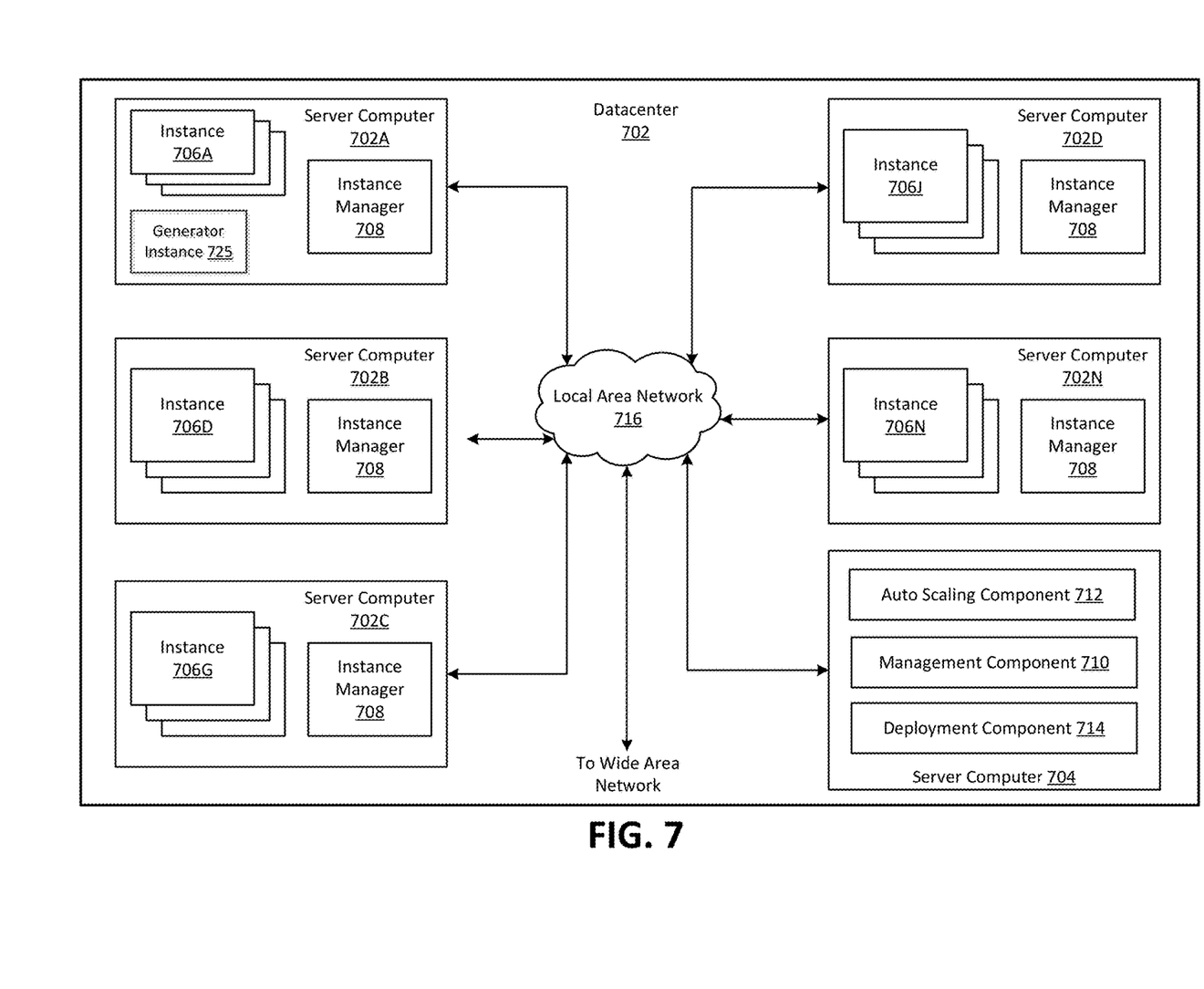
FIG. 7 depicts a computing system diagram that illustrates one configuration for datacenter that implements computing services platform.
Figure 8:
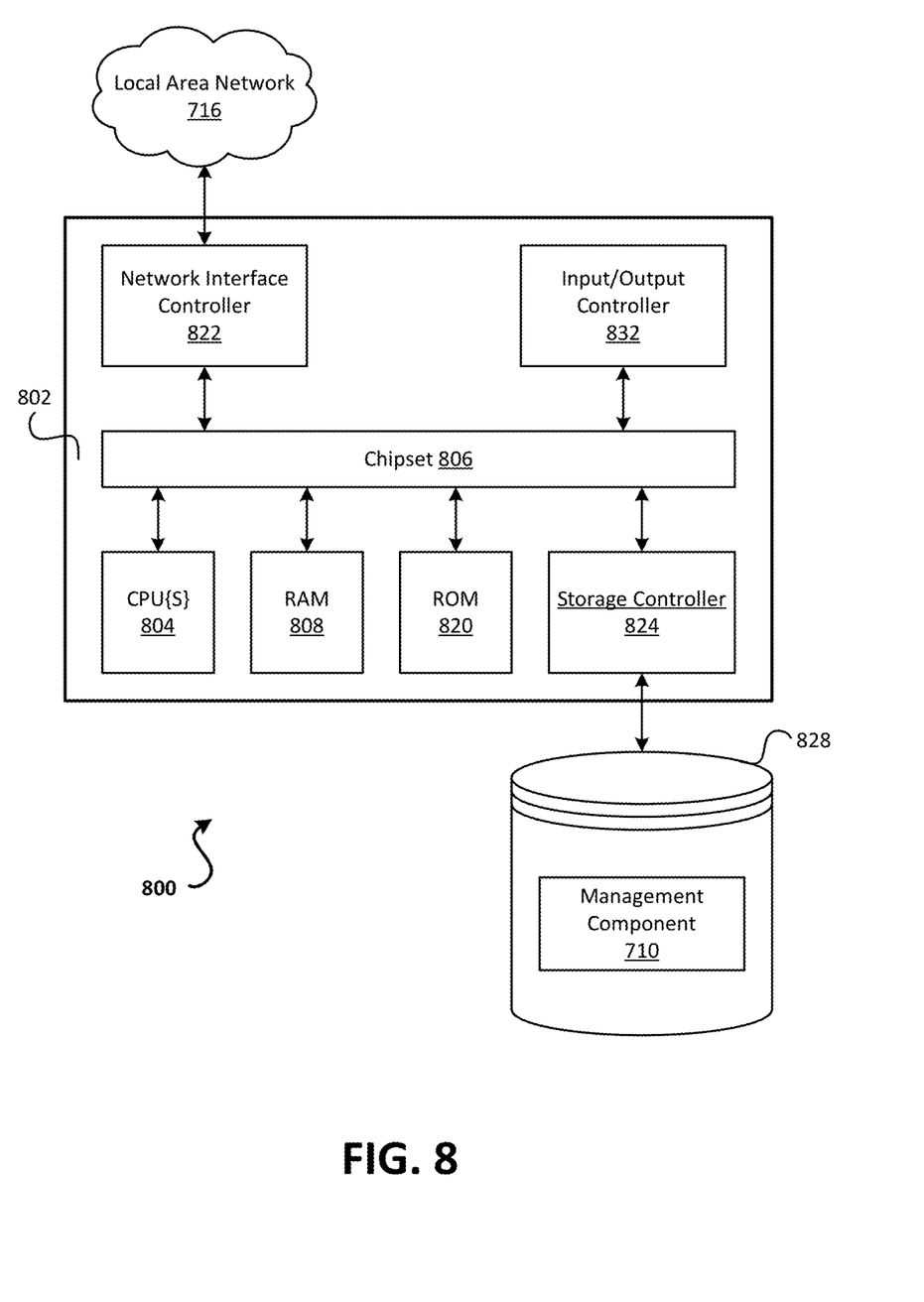
FIG. 8 depicts an example computer architecture for a computer capable of executing the above-described software components.

FIGS. 6-8 are similar to FIG. 1 in that they depict example operating environments in which embodiments disclosed herein may be implemented, and these figures depict these operating environments at varying levels of granularity. FIG. 6 generally depicts a programmable execution service platform that comprises a plurality of datacenters. FIG. 7 generally depicts a datacenter that comprises a plurality of computers. FIG. 8 generally depicts a computer.

It may be appreciated that these operating environments of FIGS. 6-8 may be used to implement aspects of the operating environments of FIG. 1. For example, HTTP server 130, database 150, and generator 140 may each or all be implemented in a datacenter 602 of FIG. 6, or across multiple datacenters 602 of FIG. 6. Likewise, network 120 of FIG. 1 may be wide area network 606 of FIG. 6 and user system 110 of FIG. 1 may be customer computing system 604 of FIG. 6.

Within a datacenter 602 of FIG. 6, HTTP server 130, database 150 and generator 140 may each be a server computer 702 or 704 of FIG. 7 (which itself may be computer 800 of FIG. 8). The communications links between these devices in FIG. 1 may be portions of local area network 716 of FIG. 7.

Turning now to details of FIG. 6, this figure depicts an example of a suitable computing environment in which embodiments described herein may be implemented. A cloud service provider (such as computing service platform 608) may configure the illustrated computing environment to host virtual clouds of entities and to enable communication paths between these virtual clouds that may otherwise be isolated. In particular, FIG. 6 is a system and network diagram that shows an illustrative operating environment 600 that includes a computing service platform 608 for implementing virtual clouds and for providing on-demand access to computing resources, such as virtual machine instances. Computing service platform 608 may provide computing resources for executing applications on a permanent or an as-needed basis and may be configured as a private network. These computing resources may include various types of resources, such as data processing resources, data storage resources, data communication resources and the like. Each type of computing resource may be general-purpose or may be available in a number of specific configurations. For example, data processing resources may be available as virtual machine instances. The instances may be configured to execute applications, including unique identifier or random number generators, mail servers, web servers, HTTP servers, storage servers, application servers, media servers, database servers and the like. Data storage resources may include file storage devices, block storage devices and the like.

Each type or configuration of computing resource may be available in different sizes, such as large resources consisting of many processors, large amounts of memory and/or large storage capacity and small resources consisting of fewer processors, smaller amounts of memory and/or smaller storage capacity. Entities may choose to allocate a number of small processing resources, such as web servers, HTTP servers, and/or one large processing resource as a database server, for example.

The computing resources provided by computing service platform 808 may be enabled by one or more datacenters 602A-602N, which may be referred herein singularly as "datacenter 602" or in the plural as "datacenters 602." Datacenters 602 may be facilities that house and operate computer systems and associated components and may include redundant and backup power, communications, cooling and security systems. Datacenters 602 may be located in a same geographical area, such as in a same facility, and may be interconnected using private networks, such as high-speed fiber optic networks, controlled and managed by a service provider of computing service platform 608. Datacenters 602 may also be distributed across geographically disparate locations and may be interconnected in part using public networks, such as the Internet. One illustrative configuration for datacenter 602 that implements the concepts and technologies disclosed herein is described below with regard to FIG. 7.

Entities of computing service platform 608 may access the computing resources provided by datacenters 602 over a wide-area network ("WAN") 606. Although a WAN is illustrated in FIG. 6, it should be appreciated that a local-area network ("LAN"), the Internet or any other networking topology known in the art that connects datacenters 602 to remote entities and other users may be utilized. It should also be appreciated that combinations of such networks may also be utilized.

An entity or other entities that are customers of computing service platform 608 may utilize a customer computing system 604 to access the computing resources provided by datacenters 602. Customer computing system 604 may include a computer capable of accessing computing service platform 608, such as a server computer, a desktop or laptop personal computer, a tablet computer, a wireless telephone, a PDA, an e-reader, a game console, a set-top box or any other computing device.

As is described in greater detail below, customer computing system 604 may be utilized to configure aspects of the computing resources provided by computing service platform 608. In this regard, computing service platform 608 may provide a web interface through which aspects of its operation may be configured through the use of a web browser application program executing on customer computing system 604. Alternatively, a stand-alone application program executing on customer computing system 604 may access an application programming interface (API) exposed by computing service platform 608 for performing the configuration operations. Other mechanisms for configuring the operation of computing service platform 608, including launching new virtual machine instances on computing service platform 608, may also be utilized.

According to embodiments disclosed herein, capacities of purchased computing resources provided by computing service platform 608 may be scaled in response to demand. In this regard, scaling refers to the process of instantiating, which may also be referred to herein as "launching" or "creating," or terminating, which may also be referred to herein as "de-scaling," instances of computing resources in response to demand.

Auto scaling may be one mechanism for scaling computing resources in response to increases or lulls in demand for the resources. Auto scaling may allow entities of computing service platform 608 to scale their purchased computing resources according to conditions defined by the entity. For instance, rules may be defined for scaling up capacity in a particular manner in response to the occurrence of specified conditions, such as a spike in demand. Similarly, rules may also be defined to scale down capacity in a particular manner in response to the occurrence of other conditions, such as a lull in demand. The mechanisms disclosed herein for launching virtual machine instances may be utilized when instances are manually launched by an entity or when instances are launched by an auto scaling component in computing service platform 608.

Computing service platform 608 may also be configured with a deployment component to assist entities in the deployment of new instances of computing resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared, and other types of information. The deployment component utilizes the entity-provided configuration and cache warming logic to launch, configure and prime new instances of computing resources.

FIG. 7 depicts a computing system diagram that illustrates one configuration for datacenter 602 that implements computing service platform 608. The example datacenter 702 shown in FIG. 7 may include several server computers 702A-702N, which may be referred herein singularly as "server computer 702" or in the plural as "server computers 702," for providing computing resources for hosting virtual clouds and for executing applications. Server computers 702 may be standard tower or rack-mount server computers configured appropriately for providing the computing resources described above. For instance, in one implementation server computers 702 may be configured to provide instances 706A-706N of computing resources.

Instances 706A-706N, which may be referred herein singularly as "instance 706" or in the plural as "instances 706," may be virtual machine instances. As known in the art, a virtual machine instance is an instance of a software implementation of a machine (i.e., a computer) that executes programs like a physical machine. In the example of virtual machine instances, each server computer 702 may be configured to execute an instance manager 708 capable of executing the instances. Instance manager 708 may be a hypervisor or another type of program configured to enable the execution of multiple instances 706 on a single server computer 702, for example. Each of instances 706 may be configured to execute all or a portion of an application. In an embodiments, generators as described herein may be instances. For example, server computer 702A may be configured with generator instance 725 that may perform any or all of the functions described herein in regard to any disclosed generator.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources, and with other types of resources. The embodiments disclosed herein may also execute all or a portion of an application directly on a computer system without utilizing virtual machine instances.

Datacenter 702 shown in FIG. 7 may also include a server computer 704 reserved for executing software components for managing the operation of datacenter 702, server computers 702 and instances 706. In particular, server computer 704 may execute a management component 710. As discussed above, an entity of computing service platform 608 may utilize customer computing system 604 to access management component 710 to configure various aspects of the operation of computing service platform 608 and instances 706 purchased by the entity. For example, the entity may purchase instances and make changes to the configuration of the instances. The entity may also specify settings regarding how the purchased instances are to be scaled in response to demand. The entity may also provide requests to launch instances to management component 710.

As also described briefly above, an auto scaling component 712 may scale instances 706 based upon rules defined by an entity of computing service platform 608. For example, auto scaling component 712 may allow an entity to specify scale up rules for use in determining when new instances should be instantiated and scale down rules for use in determining when existing instances should be terminated.

Auto scaling component 712 may execute on a single server computer 704 or in parallel across multiple server computers 702 in computing service platform 608. In addition, auto scaling component 712 may consist of a number of subcomponents executing on different server computers 702 or other computing devices in computing service platform 608. Auto scaling component 712 may be implemented as software, hardware or any combination of the two. Auto scaling component 712 may monitor available computing resources in computing service platform 808 over an internal management network, for example.

As discussed briefly above, datacenter 602 may also be configured with a deployment component 714 to assist entities in the deployment of new instances 706 of computing resources. Deployment component 714 may receive a configuration from an entity that includes data describing how new instances 706 should be configured. For example, the configuration may specify one or more applications that should be installed in new instances 706, provide scripts and/or other types of code to be executed for configuring new instances 706, provide cache warming logic specifying how an application cache should be prepared and other types of information.

Deployment component 714 may utilize the entity-provided configuration and cache warming logic to configure, prime and launch new instances 706. The configuration, cache warming logic, and other information may be specified by an entity using management component 710 or by providing this information directly to deployment component 714. Other mechanisms may also be utilized to configure the operation of deployment component 714.

In the example datacenter 702 shown in FIG. 7, an appropriate LAN 716 may be utilized to interconnect server computers 702A-702N and server computer 704. LAN 716 may also be connected to WAN 606 illustrated in FIG. 6. It should be appreciated that the network topology illustrated in FIGS. 6 and 7 has been greatly simplified and that many more networks and networking devices may be utilized to interconnect the various computing systems disclosed herein. Appropriate load balancing devices or software modules may also be utilized for balancing a load between each of datacenters 602A-602N in computing service platform 608 of FIG. 6, between each of server computers 702A-702N in datacenter 702, and between instances 706 purchased by each entity of computing service platform 608. These network topologies and devices should be apparent to those skilled in the art.

It should be appreciated that datacenter 702 described in FIG. 7 is merely illustrative and that other implementations may be utilized. In particular, functionality described herein as being performed by management component 710, auto scaling component 712 and deployment component 714 may be performed by one another, may be performed by other components or may be performed by a combination of these or other components. Additionally, it should be appreciated that this functionality may be implemented in software, hardware or a combination of software and hardware. Other implementations should be apparent to those skilled in the art.

FIG. 8 depicts an example computer architecture for a computer 800 capable of executing the above-described software components. The computer architecture shown in FIG. 8 illustrates a conventional server computer, workstation, desktop computer, laptop, tablet, network appliance, PDA, e-reader, digital cellular phone or other computing device, and may be utilized to execute any aspects of the software components presented herein described as executing on user system 110, HTTP server 130, generator 140, database 150, within datacenters 602A-602N, on server computers 702A-702N, on the customer computing system 604 or on any other computing system mentioned herein.

Computer 800 may include a baseboard, or "motherboard," that is a printed circuit board to which a multitude of components or devices may be connected by way of a system bus or other electrical communication paths. One or more central processing units ("CPUs") 804 may operate in conjunction with a chipset 806. CPUs 804 may be standard programmable processors that perform arithmetic and logical operations necessary for the operation of computer 800.

CPUs 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

Chipset 806 may provide an interface between CPUs 804 and the remainder of the components and devices on the baseboard. Chipset 806 may provide an interface to a random access memory ("RAM") 808 used as the main memory in computer 800. Chipset 806 may further provide an interface to a computer-readable storage medium such as a read-only memory ("ROM") 820 or non-volatile RAM ("NVRAM") for storing basic routines that may help to start up computer 800 and to transfer information between the various components and devices. ROM 820 or NVRAM may also store other software components necessary for the operation of computer 800 in accordance with the embodiments described herein.

Computer 800 may operate in a networked environment using logical connections to remote computing devices and computer systems through LAN 716. Chipset 806 may include functionality for providing network connectivity through a network interface controller ("NIC") 822, such as a gigabit Ethernet adapter. NIC 822 may be capable of connecting the computer 800 to other computing devices over LAN 716. It should be appreciated that multiple NICs 822 may be present in computer 800, connecting the computer to other types of networks and remote computer systems.

Computer 800 may be connected to a mass storage device 828 that provides non-volatile storage for the computer. Mass storage device 828 may store system programs, application programs, other program modules and data, including requests for unique identifiers or random numbers and tracking data for unique identifiers or random numbers, which have been described in greater detail herein. Mass storage device 828 may be connected to computer 800 through a storage controller 824 connected to chipset 806. Mass storage device 828 may consist of one or more physical storage units. Storage controller 824 may interface with the physical storage units through a serial attached ("SAS") Small Computer System Interface ("SCSI") interface, a serial advanced technology attachment ("SATA") interface, a fiber channel ("FC") interface or other type of interface for physically connecting and transferring data between computers and physical storage units.

Computer 800 may store data on mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units, whether mass storage device 828 is characterized as primary or secondary storage and the like.

For example, computer 800 may store information to mass storage device 828 by issuing instructions through storage controller 824 to alter the magnetic characteristics of a particular location within a magnetic disk drive unit, the reflective or refractive characteristics of a particular location in an optical storage unit or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 800 may further read information from mass storage device 828 by detecting the physical states or characteristics of one or more particular locations within the physical storage units.

In addition to mass storage device 828 described above, computer 800 may have access to other computer-readable storage media to store and retrieve information, such as program modules, data structures or other data. It will be appreciated by those skilled in the art that computer-readable storage media can be any available media that provides for the storage of non-transitory data and that may be accessed by computer 800.

By way of example and not limitation, computer-readable storage media may include volatile and non-volatile, transitory and non-transitory, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices or any other medium that can be used to store the desired information in a non-transitory fashion.

Mass storage device 828 may store an operating system utilized to control the operation of the computer 800. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 828 may store other system or application programs and data utilized by computer 800, such as management component 710 and/or the other software components described above.

Mass storage device 828 or other computer-readable storage media may also be encoded with computer-executable instructions that, when loaded into computer 800, transform the computer from a general-purpose computing system into a special-purpose computer capable of implementing the embodiments described herein. These computer-executable instructions transform computer 800 by specifying how CPUs 804 transition between states, as described above. Computer 800 may have access to computer-readable storage media storing computer-executable instructions that, when executed by computer 800, may perform operating procedures depicted in FIGS. 2-4.

Computer 800 may also include an input/output controller 832 for receiving and processing input from a number of input devices, such as a keyboard, a mouse, a touchpad, a touch screen, an electronic stylus or other type of input device. Similarly, input/output controller 832 may provide output to a display, such as a computer monitor, a flat-panel display, a digital projector, a printer, a plotter or other type of output device. It will be appreciated that computer 800 may not include all of the components shown in FIG. 8, may include other components that are not explicitly shown in FIG. 8 or may utilize an architecture completely different than that shown in FIG. 8.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein may be implemented in software, in hardware, or in a combination of software and hardware. Other implementations should be apparent to those skilled in the art. It should also be appreciated that a server, gateway, or other computing device may comprise any combination of hardware and/or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process operations may be omitted in some implementations. The methods and processes described herein are also not limited to any particular sequence, and the operations or states relating thereto can be performed in other sequences that are appropriate. For example, described blocks, operations, and states may be performed in an order other than that specifically disclosed and multiple blocks or states may be combined in a single block or state. The example blocks, operations, and states may be performed in serial, in parallel, or in some other manner. Blocks, operations, and states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms. Furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method comprising:
receiving, at an identifier generation system via a network from a remote system, a request for a contextually unique identifier, wherein the request is an application programming interface call, and wherein the request comprises a customer account identifier and at least one identifier parameter, the identifier parameter associated with a context;
generating, at the identifier generation system based on the at least one identifier parameter, the contextually unique identifier;
determining, at the identifier generation system, that the contextually unique identifier complies with requirements associated with at least one of the at least one identifier parameter and the customer account identifier;

storing, at the identifier generation system, the customer account identifier and the contextually unique identifier;

transmitting the contextually unique identifier from the identifier generation system to the remote system;

storing a time of generation of the contextually unique identifier and associating the time of generation of the contextually unique identifier with the contextually unique identifier;

determining that a predetermined amount of time has passed since the time of generation of the contextually unique identifier; and responsive to determining that the predetermined amount of time has passed since the time of generation of the contextually unique identifier, marking the contextually unique identifier and data associated with the contextually unique identifier for deletion from the identifier generation system.

2. The method of claim 1, wherein the at least one identifier parameter comprises at least one of a format, character type, length, number of bits, numeral system, policy identifier, or range of values.

3. A system, comprising:

a memory comprising instructions; and a processor coupled to the memory, wherein the processor, when executing the instructions, effectuates operations comprising:

receiving, from a remote system, a request for a contextually unique identifier, wherein the request is an application programming interface call;

generating the contextually unique identifier based at least in part on a context parameter;

determining a customer account identifier based on the request;

storing the customer account identifier and the contextually unique identifier;

transmitting the contextually unique identifier to the remote system;

storing a time of generation of the contextually unique identifier;

determining that a predetermined amount of time has passed since the time of generation; and in response to determining that the predetermined amount of time has passed since the time of generation, marking the time of generation and other data associated with the contextually unique identifier for deletion.

4. The system of claim 3, wherein generating the contextually unique identifier comprises concatenating the contextually unique identifier with the customer account identifier.

5. The system of claim 3, wherein the request comprises a parameter indicating a number of bits, and wherein generating the contextually unique identifier comprises generating the contextually unique identifier in the number of bits.

6. The system of claim 3, wherein the request comprises a parameter indicating range of values, and wherein generating the contextually unique identifier comprises generating the contextually unique identifier to be within the range of values.

7. The system of claim 3, wherein the request comprises a parameter indicating a numeral system, and wherein generating the contextually unique identifier comprises generating the contextually unique identifier in the numeral system.

8. The system of claim 3, further comprising, before storing the customer account identifier and the contextually unique identifier, determining that the contextually unique identifier is not currently stored and associated with the customer account identifier.

9. The system of claim 3, further comprising determining a generation algorithm to use for generating the contextually unique identifier.

10. The system of claim 3, further comprising transmitting charging data associated with generation of the contextually unique identifier to a billing system.

11. A non-transitory computer-readable storage medium comprising computer-executable instructions, which when executed by a processor, cause a processor to effectuate operations comprising:

receiving, from a remote system, a request for a contextually unique identifier, wherein the request is an application programming interface call;

generating the contextually unique identifier;

determining a customer account identifier based on the request;

storing the customer account identifier and the contextually unique identifier;

transmitting the contextually unique identifier to the remote system;

storing a time of generation of the contextually unique identifier;

determining that a predetermined amount of time has passed since the time of generation; and in response to determining that the predetermined amount of time has passed since the time of generation, deleting the time of generation and other data associated with the contextually unique identifier.

12. The non-transitory computer-readable storage medium of claim 11, wherein generating the contextually unique identifier comprises concatenating the contextually unique identifier with the customer account identifier.

13. The non-transitory computer-readable storage medium of claim 11, wherein the request comprises a parameter indicating an identifier character type, and wherein generating the contextually unique identifier comprises generating the contextually unique identifier in the identifier character type.

14. The non-transitory computer-readable storage medium of claim 11, wherein the request comprises a parameter indicating an identifier length, and wherein generating the contextually unique identifier comprises generating the contextually unique identifier having the identifier length.

15. The non-transitory computer-readable storage medium of claim 11, wherein the operations further comprise determining a time of generation of the contextually unique identifier, wherein generating the contextually unique identifier comprises concatenating the contextually unique identifier with the time of generation.

16. The non-transitory computer-readable storage medium of claim 11, wherein generating the contextually unique identifier comprises generating a plurality of contextually unique identifiers.

* * * * *